United States Patent [19]

Yoshida et al.

[11] Patent Number: 5,858,507
[45] Date of Patent: Jan. 12, 1999

[54] BIAXIALLY ORIENTED POLYESTER FILM AND PROCESS FOR PRODUCTION THEREOF

[75] Inventors: Minoru Yoshida; Kenji Tsunashima, both of Kyoto; Katsuya Toyoda, Anpachi-gun; Hidehito Minamizawa, Otsu, all of Japan

[73] Assignee: Toray Industries, Inc., Japan

[21] Appl. No.: 635,959

[22] PCT Filed: Aug. 28, 1995

[86] PCT No.: PCT/JP95/01702

§ 371 Date: Apr. 29, 1996

§ 102(e) Date: Apr. 29, 1996

[87] PCT Pub. No.: WO96/06722

PCT Pub. Date: Mar. 7, 1996

[30] Foreign Application Priority Data

Aug. 30, 1994 [JP] Japan ................................ 6-205164

[51] Int. Cl.⁶ .......................... B32B 27/20; B32B 27/36; B32B 33/00; B29C 55/14

[52] U.S. Cl. .......................... 428/141; 428/327; 428/328; 428/329; 428/330; 428/331; 428/480; 428/694 TR; 428/694 BR; 428/694 SG; 428/910; 264/288.4; 264/290.2

[58] Field of Search .................... 428/327, 328, 428/329, 330, 331, 480, 910, 141, 694 T, 694 TR, 694 BR, 694 ST, 694 SL, 594 SG; 264/288.4, 290.2

[56] References Cited

U.S. PATENT DOCUMENTS

| | | | |
|---|---|---|---|
| 4,798,759 | 1/1989 | Dallman et al. | 428/220 |
| 4,990,400 | 2/1991 | Endo et al. | 428/331 |
| 5,023,291 | 6/1991 | Sakamoto et al. | 524/430 |
| 5,096,773 | 3/1992 | Sakamoto | 428/323 |
| 5,106,681 | 4/1992 | Endo et al. | 428/323 |
| 5,139,727 | 8/1992 | Utsumi et al. | 264/210.7 |
| 5,164,439 | 11/1992 | Sakamoto et al. | 524/425 |
| 5,374,467 | 12/1994 | Sato | 428/143 |
| 5,514,462 | 5/1996 | Endo et al. | 428/323 |
| 5,534,323 | 7/1996 | Chuujou et al. | 428/65.3 |

*Primary Examiner*—Vivian Chen
*Attorney, Agent, or Firm*—Austin R. Miller

[57] ABSTRACT

A biaxially oriented polyester film wherein the ratio ($=I_{MD}/I_{ND}$) of the peak intensity ($I_{MD}$) in the longitudinal direction to the peak intensity ($I_{ND}$) in the thickness direction determined at 1615 cm$^{-1}$ by laser Raman scattering method is 6 or more; and a process for production of a biaxially oriented polyester film which comprises the steps of controlling the ratio (A/B) of the maximum thickness (A) of the edge portion of a cast film to the thickness (B) of the central portion in the transverse direction thereof in the range of 2 to 6, biaxially stretching the cast film, and controlling the peak intensity ratio of the biaxially oriented film determined by the laser Raman scattering method in the above-described range. The biaxially oriented polyester film thus produced has a specific orientation in the longitudinal direction, and therefore has great strength in the longitudinal direction and small irregularity in properties such as thickness or birefringence.

19 Claims, 1 Drawing Sheet

BIAXIALLY ORIENTED POLYESTER FILM AND PROCESS FOR PRODUCTION THEREOF

This application is a 371 of PCT/JP95/01702, filed Aug. 28, 1995.

TECHNICAL FIELD OF THE INVENTION

The present invention relates to a biaxially oriented polyester film and a process for producing the same. More particularly, the present invention relates to a specified biaxially oriented polyester film which has small irregularities in qualities such as thickness or widthwise property and wherein the productivity with respect to breakage and yield is improved. The principal orientation axis is present in the longitudinal direction and the film is more oriented in the longitudinal direction. And a process for producing the film is also disclosed.

BACKGROUND ART OF THE INVENTION

In plastic films, it is possible to continuously produce a film having a great area which cannot be achieved by other materials. Utilizing the characteristics such as strength, durability, transparency, flexibility and separation property between surface side and back surface side, plastic films are used in fields such as agricultural, package and architectural fields which require large amounts of plastic film. Specifically, because biaxially oriented polyester films have excellent mechanical, thermal, electrical and chemical properties, they are used for various fields, and particularly, the usefulness thereof as base films of magnetic tapes is unrivaled by films made from other materials. Recently, such base films have been required to be thinner in order to lighten and miniaturize equipment, enable longer recordings, and therefore, the base films have been required to be further strengthened.

Further, in the fields of heat transfer ribbons, capacitors and thermo-stencil printing plates, thin films have been strongly required, and similarly the films used have been required to be further strengthened.

As a process for strengthening a biaxially oriented polyester film, generally known is a so-called longitudinal re-stretching process for re-stretching a biaxially stretched film in the longitudinal direction and providing a high lengthwise strength to the film (for example, JP-B-SHO 42-9270, JP-B-SHO 43-3040, JP-A-SHO 46-1119 and JP-A-SHO 46-1120). Further, in a case where a film is required to be further strengthened in the transverse direction as well as in the longitudinal direction, there is a so-called longitudinal and transverse re-stretching process for re-stretching the film in the transverse direction after the longitudinal re-stretching (for example, JP-A-SHO 50-133276 and JP-A-SHO 55-22915).

However, even in such a longitudinal re-stretching process, although the principal orientation axis is present in the longitudinal direction, the orientation of the whole of the film is not so great, and irregularity in thickness and irregularities in properties in the transverse direction are not greatly improved.

Moreover, in a process having the above-described longitudinal re-stretching process, because generally a thin film having a large width is stretched by rollers, if an edge portion of the film is thin, the neck down at the time of stretching is violent, thereby causing serious problems such as deterioration of irregularity in thickness, irregularity in other properties, and generation of scratches. In order to avoid these problems, generally edges of a cast film are formed thick and a holding force is provided thereto for preventing the neck down.

In a case where longitudinal re-stretching is performed, a cast film must be formed so that a ratio (A/B) of the maximum thickness (A) of the edge portion to the thickness (B) of the central portion in the transverse direction of the cast film is a value around 10, although the ratio to be controlled depends upon the thickness of the central portion.

However, if the difference between the thickness of the edge portion and the thickness of the central portion is great as described above, although a neck down can be lessened problems occur in that the edge portion having a large thickness is insufficiently pre-heated, thereby causing frequent film breakage, and irregularity in properties in the transverse direction due to the temperature difference becomes great. Further, because the edge portions are finally trimmed away from a film product portion, thick edge portions are not desired also from the viewpoint of yield.

DISCLOSURE OF THE INVENTION

Paying attention to problems originating from a longitudinal re-stretching, an object of the present invention is to provide a biaxially oriented polyester film in which a principal orientation axis is present in the longitudinal direction and the longitudinal orientation is increased without performing a longitudinal re-stretching, and which has less irregularity. More concretely, an object of the present invention is to provide a biaxially oriented polyester film wherein the edge portions can be thinly formed without longitudinal re-stretching, the irregular thickness and the irregular properties in the transverse direction can be reduced, the frequency of film breakage can be decreased, the yield can be increased, which has a principal orientation axis in the longitudinal direction and which is more oriented in the longitudinal direction; a process for production is also disclosed.

To accomplish the above objects, a biaxially oriented polyester film according to the present invention is characterized in that a ratio R $(=I_{MD}/I_{ND})$ of a peak intensity $(I_{MD})$ in the longitudinal direction of the film to a peak intensity $(I_{ND})$ in the thickness direction of the film determined at 1615 cm$^{-1}$ by laser Raman scattering method is not less than 6.

A process for producing a biaxially oriented polyester film according to the present invention comprises the steps of controlling a ratio (A/B) of the maximum thickness (A) of an edge portion of a cast film to the thickness (B) of a central portion in the transverse direction of the cast film in the range of 2 to 6; stretching the cast film biaxially; and controlling a ratio R $(=I_{MD}/I_{ND})$ of the biaxially oriented film of a peak intensity $(I_{MD})$ in the longitudinal direction of the film to a peak intensity $(I_{ND})$ in the thickness direction of the film determined at 1615 cm$^{-1}$ by laser Raman scattering method to be not less than 6.

THE BEST MODE FOR CARRYING OUT THE INVENTION

Figure 1:
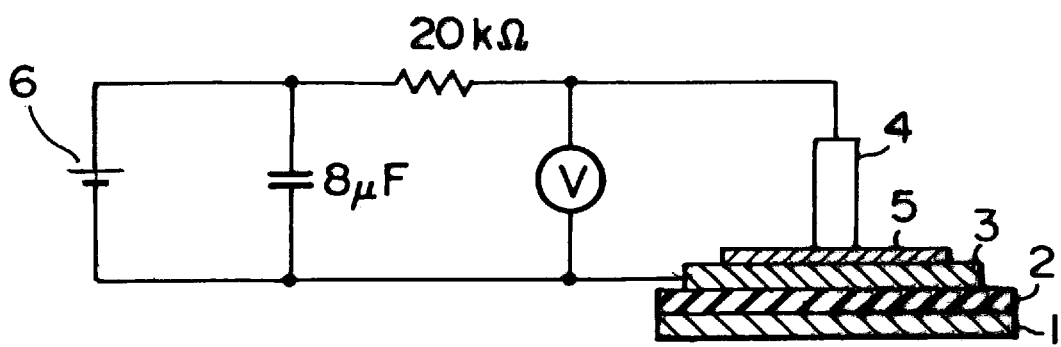
FIG. 1 is a schematic view of an apparatus for determining a breakdown voltage of a film.

In the present invention, a ratio R $(=I_{MD}/I_{ND})$ of a peak intensity $(I_{MD})$ in the longitudinal direction to a peak intensity $(I_{ND})$ in the thickness direction determined at 1615 cm$^{-1}$ by laser Raman scattering method is a factor indicating an intensity of total orientation in the longitudinal direction. This can be determined by measuring Raman scattered rays generated when a laser ray is applied to a film. In the Raman spectrum, the Raman band at 1615 cm$^{-1}$ belongs to C=C stretching vibration of a benzene ring (ν C=C), and the longitudinal orientation degree of the whole of the film can be determined by determining the ratio (=$I_{MD}/I_{ND}$) of the intensity in the longitudinal direction to the intensity in the thickness direction.

In the present invention, in order to obtain a film having a sufficiently great strength and in order to improve irregularity in thickness and irregularity in properties in the transverse direction, the intensity ratio R must be not less than 6. Preferably it is not less than 7. Further, it is preferred to be not less than 8 for use of magnetic materials.

In the biaxially oriented polyester film according to the present invention, an amorphous orientation coefficient $f_{MD}$ in the longitudinal direction of the film is preferably not less than 0.5 from the viewpoint of increase of strength, and more preferably it is not less than 0.7.

Although an F-5 value of an ordinary biaxially oriented polyester film on the market is generally in the range of 11 to 13 kg/mm$^2$, in order to remarkably accomplish the purpose of lightening and miniaturizing in uses for base films of magnetic tapes, ribbons, capacitors and thermosensible stencil printing plates, it is effective to set the F-5 value in the longitudinal direction higher, and it is preferably not less than 15 /mm$^2$, and more preferably not less than 16 /mm$^2$.

The polyester in the present invention is a polymer prepared from a diol and a dicarboxylic acid by condensation polymerization. The dicarboxylic acid is represented by terephthalic acid, isophthalic acid, phthalic acid, naphthalene dicarboxylic acid, adipic acid, sebacic acid, etc. The diol is represented by ethylene glycol, trimethylene glycol, tetramethylene glycol, cyclohexanedimethanol, etc. Concretely, for example, polymethylene terephthalate, polyethylene terephthalate, polypropylene terephthalate, polyethylene isophthalate, polytetramethylene terephthalate, polyethylene-p-oxybenzoate, poly-1,4-cyclohexylenedimethylene terephthalate and polyethylene-2,6-naphthalate can be used. Of course, these polyesters may be either homopolymer or copolymer. As the copolymerization component, for example, a diol component such as diethylene glycol, neopentyl glycol or polyalkylene glycol, or a dicarboxylic component such as adipic acid, sebacic acid, phthalic acid, isophthalic acid or 2,6-naphthalene dicarboxylic acid can be used. In the present invention, particularly, at least one selected from the group consisting of polyethylene terephthalate, polypropylene terephthalate, polyethylene isophthalate, polyethylene naphthalate (polyethylene-2,6-naphthalate) and a copolymer thereof is preferred from the viewpoint of mechanical strength, thermal resistance, chemical resistance and durability.

Further, the concentration of a COOH end group in the film is preferably in the range of not less than 15 eq/10$^6$ g and not more than 80 eq/10$^6$ g, more preferably in the range of not less than 20 eq/10$^6$ g and not more than 50 eq/10$^6$ g.

In the polyester, inorganic particles or organic particles, or other various additives such as antioxidants, antistatic agents and crystal nuclei agents may be added.

As the material of the inorganic particles, for example, an oxide such as silicon oxide, aluminum oxide, magnesium oxide, zinc oxide, iron oxide or titanium oxide, a composite oxide such as kaolin, talc or montmorillonite, a carbonate such as calcium carbonate or barium carbonate, a sulfate such as calcium sulfate or barium sulfate, a titanate such as barium titanate or potassium titanate, a phosphate such as tert calcium phosphate, secondary calcium phosphate or primary calcium phosphate, a fluoride such as calcium fluoride (fluorite), lithium fluoride or carbon fluoride, and a silicate such as sodium silicate or aluminum silicate can be used, but the material is not particularly restricted by these materials. Further, two or more kinds of particles may be used together depending upon the purpose.

As the organic particles, for example, polystyrene or crosslinked polystyrene particles, styrene-acrylic based or acrylic based crosslinked particles, vinyl based particles such as styrene-methacrylic based or methacrylic based crosslinked particles and particles of benzoguanamine-formaldehyde, silicone, polytetrafluoroethylene, polyphenylester or phenol can be used, but the particles are not particularly restricted by these particles. The particles may be particles at least a part of which is insoluble to polyester. Preferably, a copolymer of a monovinyl compound (A) having only one aliphatic unsaturated bond in the molecule and a compound (B) having two or more aliphatic unsaturated bonds in the molecule which is used as a crosslinking agent can be employed.

As examples of the compound (A) in the above copolymer, an aromatic monovinyl compound such as styrene, α-methylstyrene, fluorostyrene or vinyl pyridine, a vinyl cyanide compound such as acrylonitrile or methacrylonitrile, an acrylate monomer such as methylacrylate, ethylacrylate, propylacrylate, butylacrylate, octylacrylate, dodecylacrylate, hexadecylacrylate, 2-ethylhexylacrylate, 2-hydroxyethylacrylate, glycidylacrylate or N,N'-dimethylaminoethylacrylate, a methacrylate monomer such as methylmethacrylate, ethylmethacrylate, propylmethacrylate, isopropylmethacrylate, butylmethacrylate, sec-butylmethacrylate, arylmethacrylate, phenylmethacrylate, benzylmethacrylate, 2-ethylhexylmethacrylate, 2-hydroxyethylmethacrylate, glycidylmethacrylate or N,N'-dimethylaminoethylmethacrylate, a mono- or dicarboxylic acid and an acid anhydride of dicarboxylic acid such as acrylic acid, methacrylic acid, maleic acid or itaconic acid, or an amide based monomer such as acrylic amide or methacrylic amide can be used.

The above-described compound (A) preferably includes the following structural formula, and particularly a compound having the number of carbon of R$_2$ of not less than 4 is preferred for providing a flexible segment.

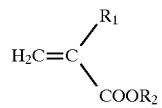

In the above formula, R$_1$ represents H or CH, and R$_2$ represents H or an alkyl group having a number of carbon of not less than 1.

It is particularly preferred that, when the compound (A) is composed of a single component, the glass transition temperature thereof is not higher than the glass transition temperature of the polyester used in the present invention, and the glass transition temperature is preferably not higher than 50° C., more preferably not higher than 20° C., and further more preferably not higher than 0° C. Concretely, preferably an acrylate monomer such as butylacrylate, octylacrylate, dodecylacrylate, hexadecylacrylate or 2-ethylhexylacrylate and a methacrylate monomer such as butylmethacrylate, sec-butylmethacrylate, hexylmethacrylate, hexadecylmethacrylate or 2-ethylhexylmethacrylate can be employed.

As examples of the compound (B), a divinylbenzene compound, or a polyfunctional acrylate or methacrylate such as ethylene glycol diacrylate, ethylene glycol dimethacrylate, polyethylene glycol diacrylate, polyethylene glycol dimethacrylate, 1,3-butylene glycol diacrylate, 1,3-butylene glycol dimethacrylate, trimethylolpropane triacrylate or trimethylolpropane trimethacrylate can be employed. Among these compounds (B), particularly divinylbenzene, ethylene glycol dimethacrylate or trimethylolpropane trimethacrylate is preferably used.

These compounds (A) and (B) can be used as a mixture of two or more kinds of the respective compounds (A) and (B). Further, The content of a pure crosslinking agent in the organic particles is preferably in the range of 1 to 90% by weight, more preferably in the range of 10 to 80% by weight, further more preferably in the range of 20 to 70% by weight. Further, components other than the compounds (A) and (B) may be added, and in order to improve the thermal resistance and the dispersion property, coating or surface treatment using a small amount of an inorganic substance may be performed.

As examples of the organic particles having a preferred composition, a crosslinked polymeric particles composed of butylacrylate-divinylbenzene copolymer, octylacrylate-divinylbenzene copolymer, 2-ethylhexylacrylate-divinylbenzene copolymer, 2-ethylhexylacrylate-ethylene glycol dimethacrylate copolymer, hexylmethacrylate-divinylbenzene copolymer or 2-ethylhexylmethacrylate-divinylbenzene copolymer can be employed.

Particularly, butylacrylate-divinylbenzene copolymer and 2-ethylhexylacrylate-divinylbenzene copolymer are preferred. Further, the particles may be composed by a three-component system such as stylene-butylacrylate-divinylbenzene copolymer or stylene-hexylmethacrylate-divinylbenzene copolymer.

Further, the organic particles preferably have a spherical shape and a uniform distribution of particle diameter from the viewpoint of good slipping property and abrasion resistance. Namely, the volume shape factor thereof is preferably in the range of 0.35 to 0.52, more preferably in the range of 0.45 to 0.51. (Where, the volume shape factor "f" is calculated by the following equation.

$$f = V/D^3$$

In the equation, "V" represents a volume of a particle ($\mu m^3$) and "D" represents the maximum diameter of the particle on a plane of projection.)

The process for producing the organic particles will be explained exemplifying a case of crosslinked organic polymeric particles. For example, there are processes for producing the particles by the following emulsion polymerizations after mixing compounds (A) and (B).

(a) soap free polymerization process: i.e., process for polymerizing without an emulsifier or using a very small amount of an emulsifier (b) seed polymerization process for adding polymer particles in a polymerization system prior to emulsion polymerization and thereafter emulsion polymerizing (c) core shell polymerization process for emulsion polymerizing a part of a monomer component and polymerizing the residual monomer in the polymerization system (d) polymerization process by the "ugel stat" disclosed in JP-A-SHO 54-97582 and JP-A-SHO 54-126288

In the above processes, particularly the processes of (c) and (d) are preferred to prepare organic particles having a uniform distribution of particle diameter.

The particles contained are preferably at least one selected from the group consisting of titanium oxide, silicon oxide, aluminum oxide, zirconium oxide, kaolin, talc, calcium phosphate, calcium carbonate, carbon black and organic particles.

Although the particle diameter, content and shape of these particles can be selected depending upon the use and the purpose, usually the mean particle diameter is preferably not less than 0.005 $\mu$m and not more than 3 $\mu$m, and the content is preferably not less than 0.01% by weight and not more than 10% by weight.

Further, the film according to the present invention may be a laminated film having two or more layers. In such a case of a laminated film having two or more layers, the ratio (d/t) of the mean particle diameter (d) of particles contained in at least one layer to the thickness (t) of the layer is preferred to be not less than 0.1 and not more than 10.

Where, the mean particle diameter of particles means a mean diameter of particles having a potential function for forming protrusions on a film surface, and it is determined by observing particles at a number of not less than 100 and not more than 1000 by a transmission type electron microscope, determining spherical equivalent diameters thereof and calculating a cumulative 50% equivalent diameter.

In the present invention, the total thickness of the film can be appropriately decided depending upon the use and the purpose.

Usually, in use for magnetic materials, the thickness is preferably not less than 1 $\mu$m and not more than 20 $\mu$m, particularly, in use for coating type magnetic recording media used for digital video tape recorders, the thickness is preferably not less than 2 $\mu$m and not more than 8 $\mu$m, and in use for metal evaporated magnetic recording media used for digital video tape recorders, the thickness is preferably not less than 3 $\mu$m and not more than 9 $\mu$m.

Further, among uses for industrial materials, in use for heat transfer ribbons, the thickness is preferably not less than 1 $\mu$m and not more than 6 $\mu$m, in use for capacitors, the thickness is preferably not less than 0.1 $\mu$m and not more than 15 $\mu$m, and in use for thermosensible stencil printing plates, the thickness is preferably not less than 0.1 $\mu$m and not more than 5 $\mu$m.

The film according to the present invention, which has an intensity ratio R of not less than 6 determined by laser Raman scattering method, can be preferably used in use for magnetic recording media, use for heat transfer ribbons, use for capacitors and use for thermo-stencil printing plates. In case of magnetic recording media, the F-5 value in the transverse direction is preferably not less than 12 $kg/mm^2$, more preferably not less than 15 $/mm^2$, to obtain a good contact property of a tape to a magnetic head and to improve the durability at the time of high-speed running, and such a property is effective for uses for a standard video cassette, an 8 millimeter video cassette, an audio cassette, a floppy disk, etc.

Particularly, in use for digital video tape recorders among uses for magnetic recording media, it is preferred that, besides the intensity ratio R determined by laser Raman scattering method is not less than 6, at least one surface is an extremely flat surface having a surface roughness (Ra) of 0.1 to 5 nm in order to achieve a high-level electromagnetic conversion property.

In order to accomplish this purpose, it is preferred that the film is formed as a laminated film having at least two layers and the above property can be achieved on at least one surface layer.

In the case of use for heat transfer ribbons, when the above-described intensity ratio R is not less than 6 and the heat shrinkage of the film in the transverse direction of the film determined at 100° C. for 30 minutes is not more than 3%, preferably not more than 1%, the flatness of the ribbon at the time of printing can be maintained, irregularity in printing letters or excessive transfer of ink can be prevented and printing with a high gradient can be achieved.

In the case of use for capacitors, when the above-described intensity ratio R is not less than 6 and the elongation at breakage of the film in the longitudinal direction of the film is not more than 100%, preferably not more than 80%, and the elongation at breakage of the film in the transverse direction of the film is not more than 200%, preferably not more than 170%, increase of the breakdown voltage and stabilization of the dielectric properties can be effectively achieved.

In the case of use for thermo-stencil printing plates, when the above-described intensity ratio R is not less than 6 and the heat of fusion ($\Delta Hu$) of the film is not more than 12 cal/g, the punching property at a low energy is excellent, it is possible to change the punching diameter depending upon an energy level, and the printing property is excellent even when a color printing is performed using a plurality of plates.

In the present invention, the film is preferably a biaxially oriented film in which a principal orientation axis is present in the longitudinal direction. In a biaxially oriented film, this means a film in which the refractive index in the longitudinal direction is greater than the refractive index in the transverse direction. Although the respective refractive indexes in the longitudinal direction and in the transverse direction can be determined by an Abbe refractometer, the determination of the direction of the principal orientation axis is also possible by a polarization microscope equipped with a Berek compensator. As a biaxially stretching process, a so-called sequential biaxially stretching process for stretching a cast film in the longitudinal direction between rollers having a difference between the circumferential speeds, and thereafter stretching the film in the transverse direction and heat treating the film in a tenter which holds the edges of the film by clips, can be used most appropriately.

Where, "a cast film" means a film formed by supplying sufficiently dried raw material pellets to an extruder, extruding a molten polymer onto a rotating metal casting drum in a form of a sheet through a T-die, and cooling and solidifying it, or a film formed by supplying non-dried pellets to a vent-type extruder and forming a sheet similarly. Although the edge portions of a cast film can be formed thicker than the central portion by a neck down generated at the time of casting, it is insufficient. Therefore, a desired thickness of the edge portions of a cast film can be achieved by increasing the amount of the flow at the edge portions by enlarging a gap between lips of the T-die at positions of the edge portions or raising the temperature of the edge portions of the die. Usually, a thickness profile of a cast film in the transverse direction is a U-shaped profile, and the outermost end portions thereof are formed to be the thickest.

In order to obtain a biaxially oriented polyester film according to the present invention which has a peak intensity ratio R ($=I_{MD}/I_{ND}$) determined by laser Raman scattering method of not less than 6, a ratio of the thickness of the edge portions to the thickness of the central portion of the film at the time of longitudinal stretching is controlled. If the ratio of the thickness of the edge portions to the thickness of the central portion of the film at the time of longitudinal stretching is less than 2, irregularity in thickness and irregularity in properties in the transverse direction become great by snake-moving or variation of width in the longitudinal stretching·pre-heating process or by neck down during the stretching. If the ratio of the thickness of the edge portions to the thickness of the central portion is over 6, the temperature of the edge portions cannot be sufficiently raised in the longitudinal stretching·pre-heating process, and irregularity in stretching and frequency of film breakage increase. Therefore, a ratio (A/B) of the maximum thickness (A) of an edge portion of a cast film to the thickness (B) of a central portion in the transverse direction of the cast film is controlled in the range of 2 to 6, preferably in the range of 2.5 to 5.

The longitudinal stretching in the present invention means stretching for providing a molecular orientation in the longitudinal direction to a film. A cast film formed so as to control the ratio of the thickness of the edge portion to the thickness of the central portion is firstly heated at a temperature of 100° to 120° C. by a plurality of heated rollers, a first-stage longitudinal stretching is performed at a draw ratio of 1.5 to 2.5 times between rollers having a circumferential speed difference, the film is cooled at a temperature of 70° to 98° C. by a plurality of rollers, and a second-stage longitudinal stretching is performed.

In the present invention, it is preferred that the longitudinal stretching is thus performed by combination of the first-stage stretching at a high temperature and the second-stage stretching at a low temperature. The reason why the temperature of the first-stage longitudinal stretching is set to a high value is for sufficiently heating the edge portions which are likely to lack in pre-heating, and also for enabling a great draw ratio, thereby orienting molecules at a high level.

If the temperature is lower than 100° C., these advantages are poor. If the temperature is higher than 120° C., the irregularity in thickness greatly deteriorates. Therefore, the temperature is preferably set in the range of 100° to 120° C. Further, If the draw ratio is less than 1.5 times, the advantage for providing a high strength is poor. If the draw ratio is more than 2.5 times, the irregularity in thickness becomes great. Therefore, the first-stage longitudinal stretching is performed preferably at a draw ratio of 1.5 to 2.5 times.

The film thus stretched at the first stage is provided with a further high-level orientation by the successive second-stage longitudinal stretching. In order to stretch the film in the transverse direction without problems after the longitudinal stretching, it is effective to stretch the film at a low temperature to suppress the thermal crystallization in the second-stage longitudinal stretching. Therefore, the second-stage longitudinal stretching is performed preferably at a temperature of not higher than 98° C. However, if the film is stretched at a temperature lower than 70° C., the stretching becomes a cold stretching, and whitening and breakage of the film frequently occurs. Therefore, the second-stage longitudinal stretching is performed preferably at a temperature of 70° to 98° C. The draw ratio is preferably set in the range of 2 to 3.5 times to suppress irregularity in stretching and breakage of the film, although it depends upon the draw ratio of the first-stage longitudinal stretching.

The temperature process from the first stage to the second stage is preferably along a monotonic lowering course. By such a temperature process, the insufficient pre-heating of the edge portions heated by the first-stage longitudinal stretching can solved, and it becomes possible to solve the problems with respect to irregularity in properties and breakage of the film.

The longitudinally stretched film thus obtained is successively introduced into a tenter in which clips grasp both end portions of the running film, and a transverse stretching and a heat treatment are performed therein. If the draw ratio in the transverse direction is less than 3 times, the properties in the transverse direction is hardly improved. If the draw ratio is more than 6 times, breakage of the film frequently occurs. Therefore, the draw ratio of the transverse stretching is set preferably in the range of 3 to 6 times. The temperature for the transverse stretching is set preferably in the range of 80° to 200° C., although it depends upon the draw ratio of the transverse stretching. Particularly, in a case where the film is stretched in the transverse direction at a high draw ratio to increase the strength in the transverse direction, the so-called temperature escalation stretching process, (in which the temperature in a stretching zone of the tenter is stageably elevated for stretching in the range of 80° to 200° C.), is preferred from the viewpoint of producing the film without breakage.

In order to provide properties of flatness and thermally dimensional stability to the biaxially oriented film, a heat treatment at a temperature of 180° to 230° C. is successively performed. Further, in order to further improve the thermal dimensional stability in the transverse direction, a so-called relaxation (in which the width of the film is contracted at a position from the latter half of the heat treatment zone to the cooling zone in the tenter) is appropriately performed.

Next, examples of the process for producing the biaxially oriented polyester film according to the present invention will be explained, but the present invention is not limited by these examples.

Polyethylene terephthalate pellets prepared as the polyester (for example, pellets added with wet silica particles having a specific surface area of 300 m$^2$/g at a content of 0.5% by weight, intrinsic viscosity: 0.681, concentration of COOH end group: 42 eq/10$^6$ g) are sufficiently dried under a vacuum. The pellets are supplied to an extruder heated at 270° to 300° C., and extruded in a form of a sheet through a T-die.

The molten sheet is cast onto a drum cooled at a surface temperature of 10° to 40° C. utilizing an electrostatic force, and cooled and solidified thereon to obtain a substantially amorphous non-stretched cast film. The cast film is formed so that the ratio (A/B) of the maximum thickness (A) of the edge portions and the thickness (B) of the central portion is in the range of 2 to 6 by adjustment of the slit gap of the die in the transverse direction. The cast film is introduced into a plurality of heated rollers, preheated at a temperature of 100° to 120° C., and while the temperature is maintained, the first-stage longitudinal stretching is performed at a draw ratio of 1.5 to 2.5 times. Successively, the film is cooled by a plurality of rollers at a temperature of 70° to 98° C., and after the second-stage longitudinal stretching is performed at that temperature, the film is quickly cooled by rollers having a temperature of 20° to 50° C. Thereafter, the film is introduced into a tenter grasping both end portion of the film by clips, and the film is stretched in the transverse direction at a draw ratio of 3 to 6 times in a hot air atmosphere heated at a temperature of 80° to 200° C.

In order to provide flatness and dimensional stability to the film thus biaxially stretched, the film is heat set in the tenter at a temperature of 180° to 230° C., and thereafter cooled uniformly and gradually down to a room temperature and wound to obtain an aimed biaxially oriented polyester film having a peak intensity ratio R ($=I_{MD}/I_{ND}$) determined by laser Raman scattering method of not less than 6.

In the present invention, in order to provide a good slipping property to the film, a releasing agent may be provided to one surface of the polyester film before or after each stretching or during each stretching.

Although a releasing agent such as a silicone oil, a fluoro-based resin or a surface active agent can be used, particularly the following releasing agents are preferred.

Namely, a releasing agent whose main constituent is a mixture of a petroleum wax (C) dissolved, emulsified and suspended in water, a plant system wax (D) and an oil substance (E), is particularly preferred. Where, the "main constituent" means that the content by weight of the mixture of the above (C), (D) and (E) is not less than 50%, preferably not less than 60%.

As the petroleum system wax, paraffin wax, microcrystalline wax and wax oxide can be used. Among these waxes, wax oxide is particularly preferred.

As the plant system wax, candelilla wax, carnauba wax, haze wax, olicurie wax, sugar cane wax, etc. can be used, and in the present invention particularly the waxes comprising the following compounds are preferred.

Namely, [rosin, non-uniform rosin, or hydrogenated rosin·αβ-substituted ethylene (α-substitution group: carboxyl, β-substitution group: hydrogen, methyl or carboxyl) added material]·alkyl or alkenyl (carbon number: 1–8) poly (repeated unit: 1–6) alcohol added with ester is particularly preferably used.

The mixing ratio of petroleum system wax to plant system wax is preferably in the range of 10/90–90/10% by weight, more preferably in the range of 20/80–80/20% by weight, further more preferably in the range of 30/70–70/30% by weight. The reason why the amount of the plant system wax is not less than 10% by weight is to appropriately achieve uniform dispersion when the wax is emulsified or suspended in water and obtain a uniform coating layer. Further, when the amount of the petroleum system wax is not less than 10% by weight, the slipping property of a coating layer is good.

In the present invention, a mixture in which an oil substance is further added to the above-described petroleum wax (C) and plant system wax (D) can be used. Where, the oil substance means an oil which is in a condition of a liquid or a paste at a room temperature, and plant oils, fats and fatty oils, mineral oils and synthesized lubricant oils can be used. As the plant oils, linseed oil, kaya oil, safflower oil, soybean oil, chinese wood oil, sesame oil, maize oil, rape seed oil, bran oil, cotton-seed oil, olive oil, sasanqua oil, tsubaki oil, caster oil, peanut oil, palm oil and coconut oil can be used. As the fats and fatty oils, beef tallow, pig tallow, sheep tallow and cocoa butter can be used. As the mineral oils, machine oil, insulating oil, turbine oil, motor oil, gear oil, cutting oil and liquid paraffin can be used. As the synthesized lubricant oils, any of the oils satisfying the requirements described in the chemical dictionary published by Kyoritsu (a Japanese publisher) can be used, and for example, olefin polymerized oil, diester oil, polyalkylene glycol oil and silicone oil can be used. Among these oils, mineral oils and synthesized lubricant oils are preferred. Further, a mixture of these oils may be used.

The above-described oil substance (E) is preferred to be added at a content of 1–100 parts by weight, preferably 3–50 parts by weight, relative to 100 parts by weight of a mixture of petroleum wax (C) and plant system wax (D). When such a mixture of a plant system wax, a petroleum wax and an oil substance is used, as compared with a case where only one of them is used, a uniform coating layer can be formed more easily, and the running ability is good, thereby preventing occurrence of sticking.

In the above-described composition, various additives can be used together as long as the advantages according to the present invention are not injured. For example, antistatic agent, heat resisting agent, antioxidant, organic and inorganic particles and pigment can be used.

Further, in order to improve the dispersion property in water, various additives, (e.g., dispersion assistants, surface active agents, antiseptic agents or antifoaming agents), may be added to the coating material.

The thickness of the releasing-material layer is preferably not less than 0.005 $\mu$m and not more than 0.4 $\mu$m, more preferably not less than 0.01 $\mu$m and not more than 0.4 $\mu$m.

In the present invention, when the releasing-material layer is coated, the coating material is preferably one dissolved, emulsified or suspended in water from the viewpoint of explosion-proof property and environmental pollution.

The coating of the releasing material may be performed at a stage either before or after the stretching of the film. In order to achieve the advantages according to the present invention more remarkably, the coating before the stretching is particularly preferred. Although the method for the coating is not particularly restricted, coating using a roll coater, a gravure coater, a reverse coater or a bar coater is preferred. Further, before coating the releasing material, as needed, corona discharge treatment in an atmosphere of air or other gases may be applied to the surface to be coated.

Further, the film according to the present invention may be combined with other materials such as a paper, a non-woven fabric and a metal.

For example, in a case where a metal is combined, it is possible to laminate a steel plate or an aluminum plate and the film according to the present invention to each other and to apply the laminate to use for architectural, industrial and can materials.

Further, in a case of use for thermo-stencil printing plates, a porous supporting material can be laminated on one surface of the film according to the present invention to form an ink path. In this case, although the porous supporting material is not particularly restricted, it must have through holes in the thickness direction, and therefore a paper, a Japanese paper or a fibrous confounding material such as a non-woven fabric is preferred.

Where, although separately produced materials may be laminated by using an adhesive or applying heat pressing, it is possible to supply a fibrous confounding material having an elongation property to the film formation process according to the present invention and to directly heat press it onto the film and co-stretch them. In a case of co-stretching thus performed, the fibers can be in a condition more stretched, and the strength of a thermosensible stencil printing plate obtained can be further increased.

[Method for determination of properties]

(1) Orientation of film determined by laser Raman scattering method:

The measuring conditions of laser Raman spectrometry are as follows.

| Apparatus: | "Ramanor" U-1000 manufactured by Jobin Yvon Corporation |
|---|---|
| Micro Raman: | Measuring arrangement; 180° scatterinq Sample table; solid |
| Light source: | Ar+ laser, GLG3300 manufactured by NEC Corporation Wave length; 515 nm |
| Spectroscope: | Constitution; 1m Czerny-Turner type double monochrometer Diffraction grating; Plane holographic, 1800 g/mm, 110 × 110 mm Dispersion; 9.23 cm$^{-1}$/mm Counterlight rejection ratio; 10$^{-14}$ (20 cm$^{-1}$) |
| Detector: | PM RCA31034 Hamamatsu 943-02 |

A film used for determination is wet polished after enclosed by polymethylmethacrylate, and the measuring section is set in a direction parallel to the longitudinal direction of the film. The measuring portion is a center portion, the measurement is repeated ten times while the measuring position is shifted, and a mean value thereof is determined. In the determination, an intensity ($I_{MD}$) of 1615 cm$^{-1}$ band in the measurement of a polarized light parallel to the longitudinal direction and an intensity ($I_{ND}$) of 1615 cm$^{-1}$ band in the measurement of a polarized light parallel to the thickness direction are measured, and the ratio R indicating the orientation is represented as R=$I_{MD}/I_{ND}$.

(2) Amorphous orientation coefficient "$f_{MD}$":

A total orientation coefficient in laser Raman scattering method aforementioned is defined by the following equation.

$$F_{t,MD}=(I_{MD}/I_{ND})/(3\ F_{t,0})$$

$$F_{t,0}=(I_{MD}/I_{ND}+I_{TD}/I_{ND}+I_{ND}/I_{ND})/3$$

Where, the standard is set as $I_{ND}$=1. The $I_{TD}$ is an intensity of 1615 cm$^{-1}$ band in the measurement of a polarized light parallel to the transverse direction in laser Raman scattering method.

Next, an orientation function $F_{C,MD}$ of (105) plane is calculated by X-ray pole figure method, and the amorphous orientation coefficient $f_{MD}$ is determined by the following equation.

$$f_{MD}=(F_{t,MD}-\chi\cdot F_{C,MD})/(1-\chi)$$

(Where, $\chi$ is a crystallization degree of a film determined by density method.)

(3) Inherent viscosity:

Using o-chlorophenol as a solvent, it is determined at 25° C.

(4) Concentration of COOH end group:

A film of 0.5 g is dissolved in o-cresol, and it is titrated by potassium hydroxide.

(5) F-5 value:

Using an "Instron" type tensile tester, a sample film is tensed at a width of 10 mm, a distance between clips of 100 mm and a tensile speed of 200 mm/min. In the tension-strain curve obtained, a tension at a position of 5% elongation is defined as the F-5 value. The determination is performed in an atmosphere having a temperature of 25° C. and a humidity of 65% RH.

(6) Refractive index:

Using an Abbe refractometer manufacture by Atago Corporation, the refractive index of a film relative to a sodium D-ray is determined in the longitudinal direction and transverse direction at 25° C.

(7) Irregularity in thickness:

Using a film thickness tester KG601A and an electronic micrometer K306C manufactured by Anritsu Corporation, a film sampled at a width of 30 mm and a length of 10 m in the longitudinal direction is passed through and the thickness is continuously determined. From the maximum thickness Tmax ($\mu$m) and the minimum thickness Tmin ($\mu$m) in the length of 10 m, $R(\mu m) = Tmax - Tmin$ is calculated, and the irregularity in thickness is determined by the following equation using a mean thickness Tave ($\mu$m) in the length of 10 m.

Irregularity in thickness (%)=R/Tave (8) Irregularity in birefringence:

Using a Berek compensator for a polarization microscope, a retardation is determined, and the birefringence ($\Delta$n) is determined by the following equation.

$\Delta n = r/d$

Where, r: retardation, d: film thickness.

With respect to the irregularity in birefringence, $\Delta$n is determined in the transverse direction of the film, and the irregularity is determined by the following standards.

⊚: The difference between the maximum value and the minimum value is less than 0.01.

○: The difference between the maximum value and the minimum value is not less than 0.01 and less than 0.02.

Δ: The difference between the maximum value and the minimum value is not less than 0.02 and less than 0.03.

×: The difference between the maximum value and the minimum value is not less than 0.03.

(9) Frequency of film breakage:

Polyethylene terephthalate vacuum dried is cast from a T-die onto a casting drum applying an electrostatic force, it is cooled and solidified to form a cast film, and the cast film is biaxially oriented by a longitudinal stretching apparatus having a plurality of rollers and a tenter and heat treated in the tenter. The film is determined in the process by the following standards.

⊚: No breakage from edge portions occurs.

○: Breakage from edge portions occurs very few times.

Δ: Breakage from edge portions occurs sometimes.

×: Breakage from edge portions occurs frequently.

(10) Electromagnetic conversion property (C/N):

A magnetic coating material and a non-magnetic coating material having the following compositions are coated in order by an extrusion coater on the surface of the film according to the present invention (the upper layer is composed of the magnetic coating material with a coating thickness of 0.1 $\mu$m, and the thickness of the lower layer composed of the non-magnetic coating material is variously changed), the coated layer is magnetically oriented, and then it is dried. After forming a back-coat layer having the following composition on the opposite surface, the film calendered by a small test calendering machine (steel roll/ steel roll; 5 stages) at a temperature of 85° C. and a linear pressure of 200 kg/cm, and thereafter, the film is cured at 60° C. for 48 hours. The film obtained is slit to make a pancake of a tape having a width of 8 mm. Then, the tape of 250 m from the pancake is incorporated into a cassette to make a cassette tape.

The C/N (carrier/noise ratio) of 7 MHz+1 MHz of the tape is determined using a Hi8 VTR (manufactured by SONY Corporation, EV-BS3000) sold on the market.

| (All parts are by weight.) | |
|---|---|
| (Composition of magnetic coating material) | |
| Ferromagnetic metal powder: | 100 parts |
| Sulfonic Na modified vinyl chloride copolymer: | 10 parts |
| Sulfonic Na modified polyurethane: | 10 parts |
| Polyisocyanate: | 5 parts |
| Stearic acid: | 1.5 parts |
| Oleic acid: | 1 part |
| Carbon black: | 1 part |
| Alumina: | 10 parts |
| Methylethylketone: | 75 parts |
| Cyclohexanone: | 75 parts |
| Toluene: | 75 parts |
| (Composition of non-magnetic coating material for lower layer) | |
| Titanium oxide: | 100 parts |
| Carbon black: | 10 parts |
| Sulfonic Na modified vinyl chloride copolymer: | 10 parts |
| Sulfonic Na modified polyurethane: | 10 parts |
| Methylethylketone: | 30 parts |
| Methylisobutylketone: | 30 parts |
| Toluene: | 30 parts |
| (Composition of back coat) | |
| Carbon black (mean diameter: 20 nm): | 95 parts |
| Carbon black (mean diameter: 280 nm): | 10 parts |
| α-Alumina: | 0.1 part |
| Zinc oxide | 0.3 part |
| Sulfonic Na modified polyurethane: | 20 parts |
| Sulfonic Na modified vinyl chloride copolymer: | 30 parts |
| Cyclohexanone: | 200 parts |
| Methylethylketone: | 300 parts |
| Toluene: | 100 parts |

(11) Irregularity in printing and Gradient:

Ink layers of cyanogen, fuchsine and yellow are coated on the obtained film to form an ink ribbon, a standard printing of color pattern is performed by a variable dot type heat transfer color printer, and the gradient is determined by observation. Further, whether wrinkles are generated in the ribbon or not is determined together by observing uniformity of printed portions.

(12) Properties for capacitors:

Dielectric property

A sample is prepared by depositing an aluminum on both surfaces of a film in a circular form having a diameter of 18 mm so that the thickness thereof is in the range of 600 to 1000 Å, and the sample is left in an atmosphere having a temperature of 20°±5° C. and a relative humidity of 65±5% for a time of not less than 48 hours.

Using a dielectric property measuring apparatus DEA-2970 manufactured by TA instruments Corporation, the temperature dependency of dielectric loss is determined at a frequency of 1 kHz and a temperature elevation speed of 2° C./min., and a case where the dielectric loss determined at 105° C. is not more than 1.3% is determined to be acceptable.

B. Breakdown voltage

It is determined as follows based on the method described in JIS-C-2319 but using a film, which is not applied with metal deposition, as a sample.

As shown in FIG. 1, a rubber plate 2 having a rubber Shore hardness of about 60 degrees and a thickness of about 2 mm is placed on a metal plate 1 having an appropriate size, ten aluminum foils 3 each having a thickness of about 6 $\mu$m are stacked thereon to form a lower electrode, and a brass column 4 having a weight of about 50 g, an edge with a roundness of about 1 mm and a flat and scratch-less bottom surface with a diameter of 8 mm is prepared as an upper electrode. The sample 5 is left in an atmosphere having a temperature of 20°±5° C. and a relative humidity of 65±5% for a time of not less than 48 hours in advance. The sample 5 is nipped between the upper electrode 4 and the lower electrode 3, a DC voltage from a DC power source 6 is applied between both electrodes by the circuit shown in FIG. 1 in an atmosphere having a temperature of 20°±5° C. and a relative humidity of 65±5%, and the DC voltage is raised from 0 V to a voltage causing a breakdown at a speed of 100 V/sec. The test is performed on 50 samples, a mean value of values each calculated by dividing the measured breakdown voltage by the thickness of the sample is determined, and a case where the mean value is not less than 400 V/μm is determined to be acceptable.

EXAMPLES

More concrete examples of the present invention will be hereunder explained.

Examples 1–7

After pellets of polyethylene terephthalate (inherent viscosity: 0.65, glass transition temperature: 69° C., melting point: 256° C., concentration of COOH end group: 36 eq/$10^6$ g, added with calcium carbonate particles having a mean diameter of 0.23 μm at a content of 0.03% by weight) were vacuum dried at 180° C. for 3 hours, they were supplied to an extruder heated at 280° C. and melt-extruded therefrom, and the molten polymer was delivered out from a T-die in a form of a sheet. The sheet was cast on a cooling drum having a temperature of 25° C. while applied with an electrostatic force, and it was cooled and solidified to prepare a non-stretched cast film. The thickness of the central portion of the cast film was all adjusted to 150 μm, and the cast film was formed so that the ratio (A/B) of the maximum thickness of the edge portion (A) to the thickness of the central portion (B) was in the range of 2 to 6.

The non-stretched film was introduced into a plurality of heated rollers and pre-heated at 110° C., and then, the film was stretched at a draw ratio of 2 times in a first-stage longitudinal stretching process. After the film was cooled at 80° C., the film was stretched at a draw ratio of 3 times in a second-stage longitudinal stretching process. The film was introduced into a tenter which grasps both end portions of the film by clips, and therein the film was stretched in the transverse direction at a temperature of 90° C. and a draw ratio of 3.5 times, and thereafter heat treated at 200° C. The peak intensity ratio R determined by laser Raman scattering method, the amorphous orientation coefficient $f_{MD}$, the F-5 value, the irregularity in thickness, the irregularity in double refraction and the frequency of film breakage of each film obtained are shown in Tables 1 and 2. The concentration of COOH end group in the film was 42 eq/$10^6$ g.

Comparative Examples 1–4

In Comparative Examples 1–4, only the maximum thickness of the edge portions of the cast film was changed, and biaxially oriented films were produced at the same film formation conditions. The peak intensity ratio R determined by laser Raman scattering method, the amorphous orientation coefficient $f_{MD}$, the F-5 value, the irregularity in thickness, the irregularity in double refraction and the frequency of film breakage of each film obtained are shown in Tables 1 and 2.

Examples 8–14

In Examples 8–14, the cast film was formed so that the thickness of the central portion was 150 μm and the maximum thickness of the edge portions was 400 μm. After the non-stretched film was pre-heated by introducing it into a plurality of heated rollers, the first-stage longitudinal stretching was performed, the film was then cooled by a plurality of rollers, and thereafter the second-stage longitudinal stretching was performed. The film was introduced into the tenter grasping the end portions of the film by clips, and after stretched in the transverse direction at a temperature of 90° C. and a draw ratio of 3.5 times, the film was heat treated at 200° C. The peak intensity ratio R determined by laser Raman scattering method, the amorphous orientation coefficient $f_{MD}$, the F-5 value, the irregularity in thickness, the irregularity in double refraction and the frequency of film breakage of each film obtained are shown in Tables 3 and 4.

Example 16, Comparative Examples 5–9

After pellets of polyethylene terephthalate (inherent viscosity: 0.65, glass transition temperature: 69° C., melting point: 256° C.) were vacuum dried at 180° C. for 3 hours, they were supplied to an extruder heated at 280° C., and the molten polymer was delivered out from a T-die in a form of a sheet. The sheet was cast on a cooling drum having a temperature of 25° C. while applied with an electrostatic force, and it was cooled and solidified to prepare a non-stretched cast film. The thickness of the central portion of the cast film was all adjusted to 150 μm, and each cast film was formed by changing the ratio (A/B) of the maximum thickness of the edge portion (A) to the thickness of the central portion (B).

The non-stretched film was stretched in the longitudinal direction at a temperature of 100° C. and a draw ratio of 3.2 times, and the film was introduced into the tenter grasping both end portions of the film by clips and stretched in the transverse direction at a temperature of 90° C. and a draw ratio of 3.5 times. Then, the biaxially oriented film was re-stretched in the longitudinal direction at a temperature of 140° C. and a draw ratio of 1.6 times, and thereafter the film was heat treated at 200° C. Where, the longitudinal stretching was performed between rollers having different circumferential speeds and the transverse stretching and the heat treatment were performed in the tenter grasping both end portions of the film by clips. The peak intensity ratio R determined by laser Raman scattering method, the amorphous orientation coefficient $f_{MD}$, the F-5 value, the irregularity in thickness, the irregularity in birefringence and the frequency of film breakage of each film obtained are shown in Table 5.

Examples 17–20

Using two extruders A and B, pellets of polyethylene terephthalate X (inherent viscosity: 0.661, glass transition temperature: 69° C., melting point: 256° C., concentration of COOH end group: 33 eq/$10^6$ g, added with spherical silica particles having a mean diameter of 100 nm at a content of 0.02% by weight) were supplied to the extruder A heated at 280° C. after vacuum dried at 180° C. for 3 hours, and pellets of polyethylene terephthalate Y (inherent viscosity: 0.675, glass transition temperature: 69° C., melting point: 255° C., concentration of COOH end group: 43 eq/$10^6$ g, added with spherical divinylbenzene-styrene copolymer particles (copolymerization mole ratio: 60: 40) having a mean diameter of 180 nm at a content of 0.05% by weight) were supplied to the extruder B heated at 280° C. after vacuum dried at 180° C. for 3 hours. The molten polymers were jointed in a T-die and the polymer sheet was cast on a cooling drum having a temperature of 30° C. while applied with an electrostatic force, and it was cooled and solidified to prepare a non-stretched laminated cast film.

Biaxially oriented laminated films were prepared in a manner similar to that of Example 4, changing the lamination thickness ratio of the film. The peak intensity ratio R determined by laser Raman scattering method, the amorphous orientation coefficient $f_{MD}$, the F-5 value, the irregularity in thickness, the irregularity in birefringence and the frequency of film breakage of each film obtained are shown in Table 6. The concentration of COOH end group in the film was 48 eq/$10^6$ g.

Example 21

Using two extruders A and B, pellets of polyethylene terephthalate X (inherent viscosity: 0.660, glass transition temperature: 69° C., melting point: 256° C., concentration of COOH end group: 35 eq/$10^6$ g, added with spherical silica particles having a mean diameter of 40 nm at a content of 0.4% by weight) were supplied to the extruder A heated at 280° C. after vacuum dried at 180° C. for 3 hours, and pellets of polyethylene terephthalate Y (inherent viscosity: 0.643, glass transition temperature: 69° C., melting point: 255° C., concentration of COOH end group: 40 eq/$10^6$ g, added with spherical divinylbenzene-styrene copolymer particles (copolymerization mole ratio: 60: 40) having a mean diameter of 180 nm at a content of 1.0% by weight) was supplied to the extruder B heated at 280° C. after vacuum dried at 180° C. for 3 hours. The molten polymers were jointed in a T-die (lamination ratio X/Y=30/1) and the polymer sheet was cast on a cooling drum having a temperature of 30° C. while applied with an electrostatic force, and it was cooled and solidified to prepare a non-stretched laminated cast film. The ratio (A/B) of the maximum thickness of the edge portion (A) to the thickness of the central portion (B) of the film was 4.5.

The film was introduced into a plurality of heated rollers and pre-heated at 110° C., and then, the film was stretched at a draw ratio of 2.2 times in the first-stage longitudinal stretching process, and after cooled by a plurality of rollers at 80° C., the film was stretched at a draw ratio of 2.6 times in a second-stage longitudinal stretching process. The film was introduced into the tenter grasping both end portions of the film by clips, and therein the film was stretched in the transverse direction at a temperature of 90° C. and a draw ratio of 3.6 times, and thereafter heat treated at 120° C.

Then, the film was stretched in the transverse direction at a draw ratio of 1.6 times and heat treated at 210° C. to prepare a biaxially oriented polyester film. The total thickness was 6.2 μm (X/Y=6.0 μm/0.2 μm), and the concentration of COOH end group in the film was 41 eq/$10^6$ g. The peak intensity ratio R determined by laser Raman scattering method, the amorphous orientation coefficient $f_{MD}$, the F-5 value and the electromagnetic conversion property of the film obtained are shown in Table 7, and it was a very good film for use for magnetic recording media.

Examples 22–24

Biaxially oriented polyester films were prepared in a manner similar to that of Example 21 other than conditions changing draw ratio and temperature in stretching. The resulted films were good for use for magnetic recording media as shown in Table 7.

Example 25

After pellets of polyethylene terephthalate (inherent viscosity: 0.626, glass transition temperature: 69° C., melting point: 256° C., concentration of COOH end group: 45 eq/$10^6$ g, added with agglomerated silica particles having a mean diameter of 0.23 μm at a content of 0.06% by weight) were vacuum dried at 180° C. for 3 hours, they were supplied to an extruder heated at 280° C. and the molten polymer was delivered out from a T-die in a form of a sheet. The sheet was cast on a cooling drum having a temperature of 25° C. while applied with an electrostatic force, and it was cooled and solidified to prepare a non-stretched cast film. The thickness of the central portion of the cast film was all adjusted to 150 μm, and the cast film was formed so that the ratio (A/B) of the maximum thickness of the edge portion (A) to the thickness of the central portion (B) was 3.5.

The non-stretched film was introduced into a plurality of heated rollers and pre-heated at 110° C., and then, the film was stretched at a draw ratio of 2.2 times in a first-stage longitudinal stretching process. After the film was cooled at 80° C., the film was stretched at a draw ratio of 3.0 times in a second-stage longitudinal stretching process. The film was introduced into the tenter grasping both end portions of the film by clips, and therein the film was stretched in the transverse direction at a temperature of 90° C. and a draw ratio of 4.2 times, and thereafter heat treated at 200° C. and relaxed in the transverse direction at a rate of 3% and a temperature of 120° C. to prepare a biaxially oriented polyester film. The concentration of COOH end group in the film was 52 eq/$10^6$ g. The peak intensity ratio R determined by laser Raman scattering method, the amorphous orientation coefficient $f_{MD}$ and the color printing property of the film obtained are shown in Table 8. As shown in Table 8, the film was very good as a film for heat transfer ribbons.

Examples 26 and 27

Biaxially oriented polyester films were prepared in the same manner as that of Example 25 other than conditions changing relaxation. The resulted films were good as films for heat transfer ribbons as shown in Table 8.

Example 28

After pellets of polyethylene terephthalate (inherent viscosity: 0.65, glass transition temperature: 69° C., melting point: 256° C., concentration of COOH end group: 27 eq/$10^6$ g, added with calcium phosphate particles having a mean diameter of 0.18 μm at a content of 0.03% by weight) were vacuum dried at 180° C. for 3 hours, they were supplied to an extruder heated at 280° C. and the molten polymer was delivered out from a T-die in a form of a sheet. The sheet was cast on a cooling drum having a temperature of 25° C. while applied with an electrostatic force, and it was cooled and solidified to prepare a non-stretched cast film. The thickness of the central portion of the cast film was all adjusted to 150 μm, and the cast film was formed so that the ratio (A/B) of the maximum thickness of the edge portion (A) to the thickness of the central portion (B) was 4.5.

The non-stretched film was introduced into a plurality of heated rollers and pre-heated at 110° C., and then, the film was stretched at a draw ratio of 2.2 times in a first-stage longitudinal stretching process. After the film was cooled at 85° C., the film was stretched at a draw ratio of 2.6 times in a second-stage longitudinal stretching process. The film was introduced into the tenter grasping both end portions of the film by clips, and therein the film was stretched in the transverse direction at a temperature of 95° C. and a draw ratio of 3.5 times, and thereafter the film was re-stretched in the longitudinal direction at a temperature of 140° C. and a draw ratio of 1.5 times. After the film was re-stretched in the transverse direction at a temperature of 190° C. and a draw ratio of 1.3 times, the film was heat treated at 200° C. and relaxed in the longitudinal direction at a temperature of 140° C. and a rate of 1% to prepare a biaxially oriented polyester film having a thickness of 3 μm. The concentration of COOH end group in the film was 33 eq/10⁶ g. The peak intensity ratio R determined by laser Raman scattering method, the amorphous orientation coefficient $f_{MD}$, the tensile elongations at break in the longitudinal and transverse directions and the properties for capacitors of the film obtained are shown in Table 9. As understood from Table 9, the film was very good as a film for capacitors.

Examples 29 and 30

Biaxially oriented polyester films were prepared in the same manner as that of Example 28 other than conditions changing draw ratios in the longitudinal and transverse directions. The resulting films were good films for capacitors as shown in Table 9.

Example 31

After pellets of polyethylene terephthalate-polyethylene isophthalate copolymer (concentration of COOH end group: 46 eq/10⁶ g, inherent viscosity: 0.702, glass transition temperature: 67° C., melting point: 255° C., copolymerization ratio: 80/20, added with agglomerated silica particles having a mean diameter of 0.32 μm at a content of 0.2% by weight) were vacuum dried at 120° C. for 3 hours and pre-crystallized, they were vacuum dried at 180° C. for 3 hours, and then they were supplied to an extruder heated at 270° C. and the molten polymer was delivered out from a T-die in a form of a sheet. The sheet was cast on a cooling drum having a temperature of 25° C. while applied with an electrostatic force, and it was cooled and solidified to prepare a non-stretched cast film. The thickness of the central portion of the cast film was all adjusted to 150 μm, and the cast film was formed so that the ratio (A/B) of the maximum thickness of the edge portion (A) to the thickness of the central portion (B) was 5.

The non-stretched film was introduced into a plurality of heated rollers and pre-heated at 105° C., and then, the film was stretched at a draw ratio of 2.0 times in a first-stage longitudinal stretching process. After the film was cooled at 80° C., the film was stretched at a draw ratio of 3.0 times in a second-stage longitudinal stretching process. The film was introduced into the tenter grasping both end portions of the film by clips, and therein the film was stretched in the transverse direction at a temperature of 90° C. and a draw ratio of 3.5 times, and thereafter the film was heat treated at 120° C. The thickness of the obtained film was 1.6 μm, the concentration of COOH end group in the film was 53 eq/10⁶ g, and the heat of fusion ΔHu was 6 cal/g. The peak intensity ratio R determined by laser Raman scattering method was 7.2 and the amorphous orientation coefficient $f_{MD}$ was 0.562. The film was laminated on a Japanese paper having a weight of 12 g/m² to make a thermo-stencil printing plate. As the result of a test pattern printing performed by "Risograph" manufactured by Riso Kagaku Corporation using this plate, the gradient and the printing property were both excellent.

Example 32

A polyethylene terephthalate non-woven fabric having a weight of 300 g/m² was laminated on the non-stretched film and the laminate was introduced into a plurality of heated rollers.

A biaxially oriented polyester film (a film laminated with a stretched non-woven fabric on one surface by heat pressing) was prepared in a manner similar to that of Example 31 other than the above-described condition. The properties with respect to the film were substantially the same as those in Example 31. Lamination with a Japanese paper is not required for this composite, and the properties for a thermo-stencil printing plate were not poor as compared with those of the laminate prepared in Example 31.

Comparative Example 10

Polyester (Y) used in Example 17 was supplied to an extruder heated at 280° C. and the molten polymer was delivered out from a T-die in a form of a sheet. The sheet was cast on a cooling drum having a temperature of 25° C. while applied with an electrostatic force, and it was cooled and solidified to prepare a non-stretched cast film. The thickness of the central portion (B) of the cast film was 150 μm, and the maximum thickness of the edge portion (A) was 1050 μm (A/B=7).

The non-stretched film was stretched in the longitudinal direction at a temperature of 100° C. and a draw ratio of 3.3 times, and the film was introduced into the tenter grasping both end portions of the film by clips, and therein the film was stretched in the transverse direction at a temperature of 95° C. and a draw ratio of 3.5 times, and thereafter the film was heat treated at 200° C. When the properties of the biaxially oriented film obtained were determined, the peak intensity ratio R (=$I_{MD}/I_{ND}$) determined by laser Raman scattering method was 4.1 and the amorphous orientation coefficient $f_{MD}$ was 0.352, and the irregularity in thickness was not less than 9% and it was poor.

TABLE 1

| | Cast film | | | Conditions of longitudinal stretching | | | |
| | Maximum thickness | Thickness of | | First stage | | Second stage | |
| | of edge portion (A) (μm) | central portion (B) (μm) | A/B | Temperature (°C.) | Draw ratio | Temperature (°C.) | Draw ratio |
| --- | --- | --- | --- | --- | --- | --- | --- |
| Example 1 | 300 | 150 | 2.0 | 110 | 2.0 | 80 | 3.0 |
| Example 2 | 375 | 150 | 2.5 | 110 | 2.0 | 80 | 3.0 |
| Example 3 | 450 | 150 | 3.0 | 110 | 2.0 | 80 | 3.0 |
| Example 4 | 525 | 150 | 3.5 | 110 | 2.0 | 80 | 3.0 |
| Example 5 | 600 | 150 | 4.0 | 110 | 2.0 | 80 | 3.0 |
| Example 6 | 750 | 150 | 5.0 | 110 | 2.0 | 80 | 3.0 |
| Example 7 | 900 | 150 | 6.0 | 110 | 2.0 | 80 | 3.0 |
| Comparative Example 1 | 270 | 150 | 1.8 | 110 | 2.0 | 80 | 3.0 |

TABLE 1-continued

| | Cast film | | | Conditions of longitudinal stretching | | | |
| | | | | First stage | | Second stage | |
| | Maximum thickness of edge portion (A) (μm) | Thickness of central portion (B) (μm) | A/B | Temperature (°C.) | Draw ratio | Temperature (°C.) | Draw ratio |
|---|---|---|---|---|---|---|---|
| Comparative Example 2 | 225 | 150 | 1.5 | 110 | 2.0 | 80 | 3.0 |
| Comparative Example 3 | 1050 | 150 | 7.0 | 110 | 2.0 | 80 | 3.0 |
| Comparative Example 4 | 1200 | 150 | 8.0 | 110 | 2.0 | 80 | 3.0 |

TABLE 2

| | F-5 value (kg/mm$^2$) | | Principal orientation axis | Irregularity in thickness (%) | Irregularity in birefringence | Frequency of film breakage | Peak intensity ratio R in laser Raman scattering (=I$_{MD}$/I$_{ND}$) | Amorphous orientation coefficient f$_{MD}$ |
| | Longitudinal direction | Transverse direction | | | | | | |
|---|---|---|---|---|---|---|---|---|
| Example 1 | 19.0 | 10.8 | Longitudinal direction | 3.5 | ○ | ○ | 10.9 | 0.772 |
| Example 2 | 19.0 | 11.0 | Longitudinal direction | 3.0 | ⊙ | ⊙ | 12.3 | 0.791 |
| Example 3 | 19.5 | 11.0 | Longitudinal direction | 2.7 | ⊙ | ⊙ | 13.1 | 0.821 |
| Example 4 | 20.0 | 11.0 | Longitudinal direction | 2.5 | ⊙ | ⊙ | 15.2 | 0.850 |
| Example 5 | 20.0 | 11.0 | Longitudinal direction | 2.5 | ⊙ | ⊙ | 14.8 | 0.843 |
| Example 6 | 19.5 | 10.9 | Longitudinal direction | 2.9 | ⊙ | ⊙ | 13.4 | 0.816 |
| Example 7 | 19.0 | 10.8 | Longitudinal direction | 3.7 | ○ | ○ | 12.6 | 0.783 |
| Comparative Example 1 | 18.8 | 10.5 | Longitudinal direction | 5.0 | Δ | Δ | 5.2 | 0.481 |
| Comparative Example 2 | 18.5 | 10.4 | Longitudinal direction | 6.5 | X | X | 5.1 | 0.473 |
| Comparative Example 3 | 18.7 | 10.5 | Longitudinal direction | 5.5 | Δ | Δ | 5.0 | 0.468 |
| Comparative Example 4 | 18.3 | 10.2 | Longitudinal direction | 6.9 | X | X | 5.4 | 0.475 |

TABLE 3

| | Cast film | | | | Conditions of longitudinal stretching | | | |
| | | | | | First stage | | Second stage | |
| | Maximum thickness of edge portion (A) (μm) | Thickness of central portion (B) (μm) | A/B | Principal orientation axis | Temperature (°C.) | Draw ratio | Temperature (°C.) | Draw ratio |
|---|---|---|---|---|---|---|---|---|
| Example 8 | 400 | 150 | 4.0 | Longitudinal direction | 105 | 2.0 | 80 | 3.0 |
| Example 9 | 400 | 150 | 4.0 | Longitudinal direction | 115 | 2.0 | 80 | 3.0 |
| Example 10 | 400 | 150 | 4.0 | Longitudinal direction | 110 | 1.7 | 80 | 3.0 |
| Example 11 | 400 | 150 | 4.0 | Longitudinal direction | 110 | 2.3 | 80 | 3.0 |
| Example 12 | 400 | 150 | 4.0 | Longitudinal direction | 110 | 2.0 | 75 | 3.0 |
| Example 13 | 400 | 150 | 4.0 | Longitudinal direction | 110 | 2.0 | 90 | 3.0 |
| Example 14 | 400 | 150 | 4.0 | Longitudinal direction | 110 | 2.0 | 95 | 3.0 |

TABLE 4

|  | F-5 value (kg/mm$^2$) | | Irregularity in thickness (%) | Irregularity in birefringence | Frequency of film breakage | Peak intensity ratio R in laser Raman scattering (=$I_{MD}/I_{ND}$) | Amorphous orientation coefficient $f_{MD}$ |
|---|---|---|---|---|---|---|---|
|  | Longitudinal direction | Transverse direction | | | | | |
| Example 8 | 19.5 | 11.0 | 2.3 | ⊚ | ○ | 11.6 | 0.755 |
| Example 9 | 18.8 | 11.0 | 3.0 | ⊚ | ⊚ | 9.2 | 0.700 |
| Example 10 | 18.5 | 10.8 | 2.3 | ⊚ | ⊚ | 9.2 | 0.708 |
| Example 11 | 20.2 | 10.6 | 3.8 | ⊚ | ⊚ | 15.5 | 0.831 |
| Example 12 | 20.3 | 11.0 | 2.4 | ⊚ | ○ | 15.3 | 0.822 |
| Example 13 | 19.3 | 10.7 | 3.2 | ⊚ | ⊚ | 12.2 | 0.766 |
| Example 14 | 18.1 | 10.5 | 3.8 | ○ | ⊚ | 8.9 | 0.693 |

TABLE 5

|  | Cast film | | | Principal orientation axis | F-5 value (kg/mm$^2$) | | Irregularity in thickness (%) | Irregularity in birefringence | Frequency of film breakage | Peak intensity ratio R in laser Raman scattering (=$I_{MD}/I_{ND}$) | Amorphous orientation coefficient $f_{MD}$ |
|---|---|---|---|---|---|---|---|---|---|---|---|
|  | Maximum thickness of edge portion (A) (μm) | Thickness of central portion (B) (μm) | A/B | | Longitudinal direction | Transverse direction | | | | | |
| Comparative Example 5 | 225 | 150 | 1.5 | Longitudinal direction | 19.5 | 9.0 | broken in a tener for heat treatment | | | — | — |
| Comparative Example 6 | 1200 | 150 | 8.0 | Longitudinal direction | 18.3 | 10.2 | 3.8 | Δ | Δ | 5.3 | 0.452 |
| Comparative Example 7 | 1500 | 150 | 10.0 | Longitudinal direction | 18.5 | 10.4 | 3.0 | Δ | Δ | 5.2 | 0.443 |
| Comparative Example 8 | 1800 | 150 | 12.0 | Longitudinal direction | 18.2 | 10.5 | 2.5 | X | X | 5.4 | 0.431 |
| Comparative Example 9 | 2250 | 150 | 15.0 | Longitudinal direction | 17.5 | 10.7 | broken in longitudinal re-stretching | | | — | — |
| Example 16 | 750 | 150 | 5.0 | Longitudinal | 14.8 | 12.5 | 3.6 | ○ | ○ | 6.5 | 0.606 |

TABLE 6

|  | Thickness ratio of polyethylene terephthalate (X) to polyethylene terephthalate (Y) (X/Y) | Ratio of particle diameter to thickness of X-layer side (d/t) | Ratio of particle diameter to thickness of Y-layer side (d/t) | Total thickness of final film (μm) | F-5 value (kg/mm$^2$) | | Irregularity in thickness (%) | Irregularity in birefrigence | Frequency of film breakage | Peak intensity ratio R in laser Raman scattering (= $I_{MD}/I_{ND}$) | Amorphous orientation coefficient $f_{MD}$ |
|---|---|---|---|---|---|---|---|---|---|---|---|
|  | | | | | Longitudinal direction | Transverse direction | | | | | |
| Example 17 | 2.0/5.0 | 0.05 | 0.16 | 7 | 18.8 | 11.2 | 2.6 | ⊚ | ⊚ | 14.8 | 0.840 |
| Example 18 | 1.0/6.0 | 0.10 | 0.13 | 7 | 19.2 | 10.6 | 2.4 | ⊚ | ⊚ | 15.1 | 0.836 |
| Example 19 | 2.0/4.0 | 0.05 | 0.20 | 6 | 19.0 | 10.7 | 2.4 | ⊚ | ○ | 15.4 | 0.843 |
| Example 20 | 0.1/4.9 | 1.0 | 0.16 | 5 | 19.1 | 10.7 | 2.2 | ⊚ | ⊚ | 16.0 | 0.861 |

TABLE 7

|  | Conditions of first longitudinal stretching | | Conditions of second longitudinal stretching | | Conditions of transverse stretching | | Conditions of transverse re-stretching | |
|---|---|---|---|---|---|---|---|---|
|  | Temperature (°C.) | Draw ratio | Temperature (°C.) | Draw ratio | Temperature (°C.) | Draw ratio | Temperature (°C.) | Draw ratio |
| Example 21 | 110 | 2.2 | 80 | 2.6 | 90 | 3.6 | 200 | 1.6 |
| Example 22 | 110 | 2.2 | 80 | 2.7 | 95 | 3.6 | 200 | 1.5 |

TABLE 7-continued

| | | | | | | | | |
|---|---|---|---|---|---|---|---|---|
| Example 23 | 110 | 2.0 | 80 | 2.8 | 95 | 3.5 | 200 | 1.7 |
| Example 24 | 110 | 2.2 | 80 | 2.8 | 90 | 3.2 | 200 | 1.8 |

| | Surface roughness (nm) | | F-5 value (kg/mm$^2$) | | Peak intensity ratio R in laser Raman scattering (= $I_{MD}/I_{ND}$) | Amorphous orientation coefficient $f_{MD}$ | Electromagnetic conversion property (C/N) |
|---|---|---|---|---|---|---|---|
| | X-layer side | Y-layer side | Longitudinal direction | Transverse direction | | | |
| Example 21 | 0.50 | 7.2 | 17.5 | 19.3 | 13.2 | 0.803 | +1.2 |
| Example 22 | 0.63 | 7.3 | 19.3 | 17.5 | 14.3 | 0.816 | +1.3 |
| Example 23 | 0.65 | 7.0 | 17.8 | 20.5 | 13.0 | 0.791 | +1.0 |
| Example 24 | 0.55 | 7.3 | 17.0 | 21.5 | 13.4 | 0.790 | +1.5 |

TABLE 8

| | Relaxation (%) | F-5 value (kg/mm$^2$) | | Heat shrinkage (100° C. × 30 min., %) | Peak intensity ratio R in laser Raman scattering (= $I_{MD}/I_{ND}$) | Amorphous orientation coefficient $f_{MD}$ | Printing property | |
|---|---|---|---|---|---|---|---|---|
| | | Longitudinal direction | Transverse direction | | | | gradient | wrinkle |
| Example 25 | 3 | 18.8 | 17.3 | 0.4 | 13.6 | 0.760 | good | none |
| Example 26 | 1 | 18.9 | 18.8 | 0.9 | 13.7 | 0.772 | good | none |
| Example 27 | 5 | 18.8 | 15.5 | 0.2 | 11.9 | 0.752 | good | none |

TABLE 9

| | Draw ratio | | | | | Relaxation in longitudinal direction (%) |
|---|---|---|---|---|---|---|
| | First stage of longitudinal stretching | Second stage of longitudinal stretching | Transverse stretching | Longitudinal re-stretching | Transverse re-stretching | |
| Example 28 | 2.2 | 2.6 | 3.5 | 1.5 | 1.3 | 1.0 |
| Example 29 | 2.0 | 3.3 | 3.3 | — | 1.8 | 0.5 |
| Example 30 | 2.0 | 2.2 | 3.8 | 1.6 | — | 0.5 |

| | F-5 value (kg/mm$^2$) | | Elongation at breakage | | Peak intensity ratio R in laser Raman scattering ($I_{MD}/I_{ND}$) | Amorphous orientation coefficient $f_{MD}$ | Property for capacitor | |
|---|---|---|---|---|---|---|---|---|
| | Longitudinal direction | Transverse direction | Longitudinal direction | Transverse direction | | | Dielectric loss at 105° C. (%) | Breakdown voltage (V/μm) |
| Example 28 | 20.0 | 19.8 | 43 | 75 | 15.6 | 0.823 | 0.98 | 610 |
| Example 29 | 19.3 | 20.0 | 65 | 85 | 14.8 | 0.799 | 1.06 | 500 |
| Example 30 | 20.5 | 17.3 | 40 | 92 | 16.2 | 0.843 | 1.12 | 550 |

INDUSTRIAL APPLICATIONS OF THE INVENTION

In the biaxially oriented film according to the present invention, because the film has a specified orientation in the longitudinal direction, the irregularity in properties of the film such as irregularity in thickness and irregularity in birefringence is small as well as the strength of the film in the longitudinal direction is great. Therefore, the film is useful particularly as a base film for magnetic recording media, heat transfer ribbons, capacitors and thermo-stencil printing plates which require thin films.

We claim:

1. A biaxially oriented polyester film characterized in that it has a Raman intensity ratio (R), of 6 or more, said Raman intensity ratio being defined by the relationship $R=I_{MD}/I_{ND}$ wherein $I_{MD}$ is the peak intensity in the longitudinal direction of said film, and ($I_{ND}$) is the peak intensity in the thickness direction of the film, as determined at 1615 cm$^{-1}$ by the laser Raman scattering method.

2. A biaxially oriented polyester film according to claim 1, said film having a molecular chain, wherein the amorphous orientation coefficient $f_{MD}$ of said molecular chain in the longitudinal direction of said film is 0.5 or more.

3. A biaxially oriented polyester film according to claim 2 wherein said film has a F-5 value in the longitudinal direction of said film, which is 15 kg/mm$^2$ or more.

4. A biaxially oriented polyester film according to claim 1, wherein said film has an F-5 value in the longitudinal direction of said film, which is 15 kg/mm$^2$ or more.

5. A biaxially oriented polyester film according to claim 1, wherein the polyester of said film is at least one selected from the group consisting of polyethylene terephthalate, polypropylene terephthalate, polyethylene isophthalate, polyethylene naphthalate, and a copolymer thereof.

6. A biaxially oriented polyester film according to claim 1, having a concentration of COOH end groups in said film wherein said concentration of COOH end groups in said film is in the range of 15–80 eq/$10^6$ g.

7. A biaxially oriented polyester film according to claim 1, said film having particles, wherein said particles are contained in said film at a content of 0.01–10% by weight.

8. A biaxially oriented polyester film according to claim 6, wherein said particles are at least one selected from the group consisting of titanium oxide, silicon oxide, aluminum oxide, zirconium oxide, kaolin, talc, calcium phosphate, calcium carbonate, carbon black and organic particles.

9. A biaxially oriented polyester film according to claim 1, wherein said film is formed as a laminated film, said laminated film having at least two layers, wherein at least one layer of said laminated film has a thickness (t), and contains particles, said particles having a mean particle diameter (d), and wherein said layer of said laminated film has a ratio (d/t) of 0.1–10.

10. A biaxially oriented polyester film according to claim 1, wherein said film has an F-5 value in the transverse direction of said film of 12 kg/mm$^2$ or more, and said film is used for magnetic recording media.

11. A biaxially oriented polyester film according to claim 1 wherein said film has a total thickness in the range of 2–8 μm; a surface roughness (Ra) in the range of 0.1 to 5 nm; and said film is used for coated magnetic recording media used for digital video tape recorders.

12. A biaxially oriented polyester film according to claim 1, wherein said film has a total thickness of 3–9 μm; a surface roughness (Ra) in the range of 0.1 to 5 nm; and said film is used for evaporated metal magnetic recording media used for digital video tape recorders.

13. A biaxially oriented polyester film according to claim 1, wherein said film has a heat shrinkage in the transverse direction of said film of 3% or less, wherein said heat shrinkage is measured at 100° C. for 30 minutes, and said film is used for heat transfer ribbons.

14. A biaxially oriented polyester film according to claim 1, wherein said film has a tensile elongation at break of said film in the longitudinal direction of said film of 100% or less, and said film is used for capacitors.

15. A biaxially oriented polyester film according to claim 1, wherein said film has a tensile elongation at break of said film in the transverse direction of said film of 200% or less, and said film is used for capacitors.

16. A biaxially oriented polyester film according to claim 1, wherein said film has a heat of fusion (Δ Hu) of 12 cal/g or less, and said film is used for thermo-stencil printing plates.

17. A process for producing a biaxially oriented polyester film comprising the steps of:

casting a cast film having a plurality of edge portions and a central portion, said edge portions having a thickness and said central portion having a thickness;

controlling a ratio (A/B) of the maximum thickness of an edge portion of a cast film (A) to the thickness of a central portion in the transverse direction of a cast film (B) in the range of 2 to 6;

stretching said cast film biaxially; and controlling the Raman intensity ratio (R) of the biaxially oriented film to be 6 or more, said Raman intensity ratio being defined by the relationship R=$I_{MD}/I_{ND}$ wherein ($I_{MD}$) is the peak intensity in the longitudinal direction of the film, and (IND) is the peak intensity in the thickness direction of the film determined at 1615 cm$^{-1}$ by the laser Raman scattering method.

18. A process for producing a biaxially oriented polyester film according to claim 17, wherein said stretching of said cast film is accomplished by performing a first axial stretching and a second axial stretching, wherein said first axial stretching is performed in the longitudinal direction of said film in two or more stages, and thereafter a second axial stretching is performed in the transverse direction.

19. A process for producing a biaxially oriented polyester film according to claim 18, wherein said first axial stretching is comprised of a first-stage longitudinal stretching and a second-stage longitudinal stretching, said first-stage longitudinal stretching is performed at a temperature of 100° to 120° C. at a draw ratio of 1.5 to 2.5 times, said second-stage longitudinal stretching is performed at a temperature of 70° to 98° C., and thereafter, said second axial stretching is performed at a draw ratio of 3 to 6 times.

* * * * *

UNITED STATES PATENT AND TRADEMARK OFFICE
CERTIFICATE OF CORRECTION

PATENT NO. : 5,858,507
DATED : January 12, 1999
INVENTOR(S) : Yoshida, et al.

It is certified that error appears in the above-identified patent and that said Letters Patent is hereby corrected as shown below:

Column 2, line 19, please delete "also".

Column 9, line 1, after "can" and before "solved", please insert --be--.

Column 14, line 38, please change "Dielectric property" to --A. Dielectric property:--.

Signed and Sealed this

Twenty-eighth Day of September, 1999

Attest:

Q. TODD DICKINSON

*Attesting Officer*   *Acting Commissioner of Patents and Trademarks*